United States Patent [19]
Wagner et al.

[11] Patent Number: 5,097,239
[45] Date of Patent: Mar. 17, 1992

[54] FIXTURE AND METHOD FOR MULTI-POLE MAGNETIZATION OF A MAGNETIZABLE PART

[75] Inventors: Rolf Wagner, Dreieich; Thomas Schilling, Frankfurt; Bernd Schleede, Alzenau; Reiner Dinter, Bruchköbel; Joachim von Gerlach, Ronneburg, all of Fed. Rep. of Germany

[73] Assignee: Vacuumschmelze GmbH, Fed. Rep. of Germany

[21] Appl. No.: 675,854

[22] Filed: Mar. 27, 1991

[30] Foreign Application Priority Data

Apr. 14, 1990 [DE] Fed. Rep. of Germany ....... 4012129

[51] Int. Cl.$^5$ .......................... H01F 7/20; H01F 13/00
[52] U.S. Cl. .................................................. 335/284
[58] Field of Search .................. 335/284; 361/143, 149, 361/267

[56] References Cited

U.S. PATENT DOCUMENTS 4,470,031 9/1984 Steingroever et al. .
4,737,753 4/1988 Oudet .................................. 335/284

FOREIGN PATENT DOCUMENTS

WO85/03801 4/1985 PCT Int'l Appl. .
WO85/04512 10/1985 PCT Int'l Appl. .
1485318 6/1989 U.S.S.R. ............................... 335/284

OTHER PUBLICATIONS

N. Ziobro, Ribbon-Wound Fixture for Magnetizing Ferrite Carriers, Jan. 1984, 49–50.

Primary Examiner—Leo P. Picard
Assistant Examiner—Ramon M. Barrera
Attorney, Agent, or Firm—Hill, Van Santen, Steadman & Simpson

[57] ABSTRACT

A fixture for multi-pole magnetization of a magnetizable part has two carrier plates, each having a serpentine channel therein, with an electrical conductor contained in each channel. The electrical conductors each have a thin portion having a cross section which is less than the cross section of the remainder of the conductor. The thin portions of the conductors are mounted so as to be movable in the channels. A part to be magnetized is arranged between the thin portions of the conductors, and the conductors are supplied with a current surge. As a result of the flexibility, and the movable mounting, of the conductor portions, they are caused by the power surge to move against the magnetizable part, thereby creating differently magnetized, adjacent regions in the part, having a boundary therebetween coinciding with the location of the thin portions. A magnet is thereby achieved which is substantially the same as joined individual magnets of opposite polarity.

19 Claims, 3 Drawing Sheets

FIXTURE AND METHOD FOR MULTI-POLE MAGNETIZATION OF A MAGNETIZABLE PART

BACKGROUND OF THE INVENTION

1. Field of the Invention

The present invention is directed to a fixture for multi-pole magnetization of a magnetizable part, and a method for operating the fixture.

2. Description of the Prior Art

An apparatus is disclosed in European Application 0 174 966 for a multi-pole magnetization of a magnetizable part, which imparts neighboring regions of opposite magnetization to the part. The magnetizable part is disposed between two serpentine electrical conductors contained in respective grooves or channels of two carrier plates disposed on opposite sides of the part, and magnetization is accomplished by a power surge flowing through the conductors. The carrier plates consist of permeable material, and as a result of the serpentine grooves and conductors, the neighboring regions of the magnetizable part are subjected to magnetization in different directions. The two carrier plates are movable relative to each other, and have planar pole surfaces which press against the regions to be magnetized via intervening thin sheets of insulating material.

A problem in the operation of this known device is that a boundary region of non-negligible thickness arises between the neighboring regions which are oppositely magnetized, so that the resulting magnetized part does not behave as a magnet system comparable to two oppositely magnetized individual magnets secured to each other.

SUMMARY OF THE INVENTION

It is an object of the present invention to provide a fixture for multi-pole magnetization of a magnetizable part which creates a magnetized part wherein the neighboring regions of opposite magnetization abut so closely that the magnetized part behaves substantially as a magnet system of two oppositely magnetized individual magnets secured to each other.

It is a further object of the present invention to provide a method for operating such a fixture.

Compound magnets, or multi-pole magnets having no interspace between the oppositely magnetized regions, are required, for example, for stepping motors and positioner drives. The magnetizable parts usually consist of magnetic materials having rare earth metals such as, for example, CoSm or NdFeB alloys, which have an extremely high coercivity, and therefore require an extremely high magnetic field for magnetization. In known devices of the type described above, large copper cross sections are necessary to achieve the high magnetization fields, at least for a short duration. These copper cross sections are capable of accepting high pulsed currents of more than 30 kA. Because of the large amount of heat which is generated due to the resistance in the electrical conductors, smaller cross sections cannot be used without significantly shortening the pulse duration of the current, or without providing an effective cooling system which dissipates a large amount of heat in a very short time.

The above objects are achieved in accordance with the principles of the present invention, without encountering the above problems, in a multi-pole magnetization fixture wherein each conductor has a thin portion which is mounted in the carrier so as to be movable in its channel. When the conductors are supplied with a power surge, the thin portions of the conductors are caused to move toward the magnetizable part disposed therebetween. As a result, neighboring regions of opposite magnetization are produced in the part with a sharply defined boundary therebetween, the boundary coinciding with the location of the thin portions of the conductors.

Due to the use of non-permeable material, the inductivity of the magnetization circuit can be considerably reduced, so that extremely short power surges, having a low total energy, can be achieved with high current. This permits the respective thin portions of the conductors to have a relatively small cross section and, under certain circumstances, permit the thin portions to come into direct contact with the surface of the part to be magnetized. Even under other conditions, however, at most only a thin insulating layer, and possibly compensating plates, must be interposed between the thin portions and the magnetizable part.

Another condition for the effective use of a relatively small cross section, i.e., a high power density, in the electrical conductors is the movable mounting of the thin portions of the conductors in the grooves or channels. When the conductors are subject to the power surge, an extremely high force is exerted at the time of current flow on the thin portions, however, the thin portions can be confined between the walls of the grooves in the carriers, and the surface of the magnetizable part facing the conductor.

All of these features in combination result in an extremely narrow transition zone between the neighboring regions of opposite magnetization in the resulting magnetized part, so that a multi-pole magnet is achieved having substantially the same properties as compound, individual magnets joined to each other having opposite magnetization directions.

DESCRIPTION OF THE PREFERRED EMBODIMENTS

Figure 1:
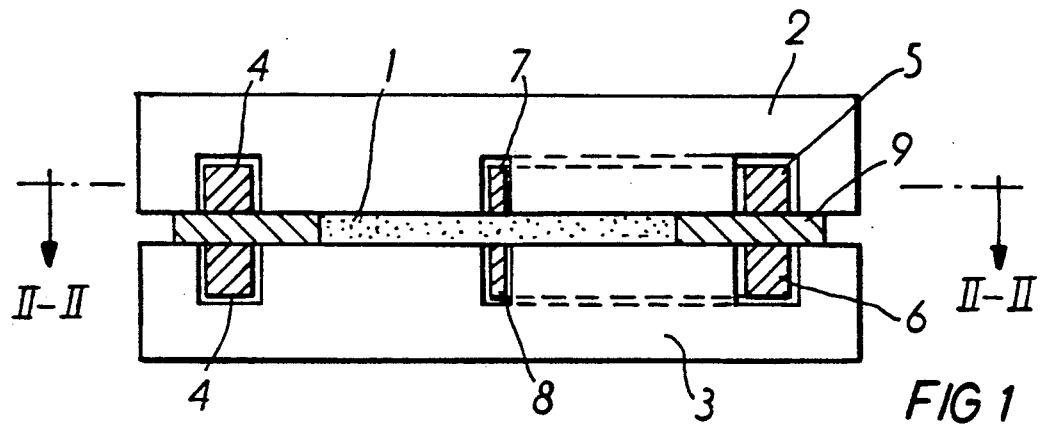
FIG. 1 is a first sectional view, taken along line I—I of FIG. 2, of a magnetization fixture constructed in accordance with the principles of the present invention.
Figure 2:
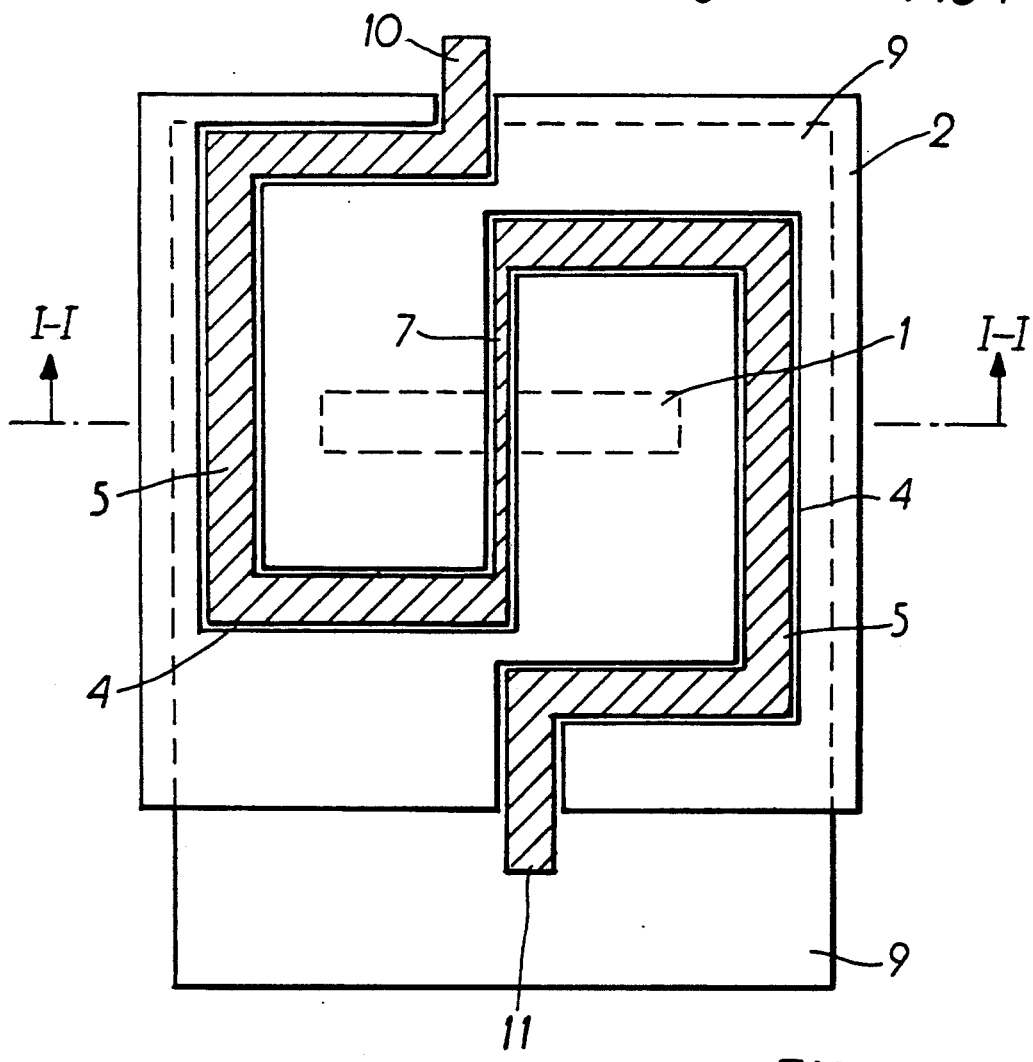
FIG. 2 is a second sectional view, taken along line II—II of FIG. 1, of a magnetization fixture constructed in accordance with the principles of the present invention.

In the exemplary embodiment of a magnetization fixture constructed in accordance with the principles of the present invention, shown in FIGS. 1 and 2, a magnetizable part 1, which is to be magnetized, is situated between two carrier plates 2 and 3. The carrier plates 2 and 3 preferably consist of non-magnetic material having low permeability, for limiting the inductivity of the electrical circuit.

The carrier plates 2 and 3 each have a serpentine channel 4 therein, with electrical conductors 5 and 6 being respectively disposed in the channels 4. The conductors 5 and 6 follow the serpentine path of the channels 4, and are thus also serpentine, so that oppositely directed magnetic fields are generated side-by-side in the region in which the part 1 to be magnetized is disposed, and corresponding to the desired magnetization direction.

Over most of their length, the electrical conductors 5 and 6 have a relatively large cross section. The conductors 5 and 6, however, have respective regions (webs) 7 and 8 of significantly reduced cross section located at the portions of the electrical conductors 5 and 6 which cross the part 1 to be magnetized. The regions 7 and 8 are thus the determining factor for the size of the transition zone between the regions to be magnetized opposite one another in the part 1. At least the regions 7 and 8 are movably arranged in the channels 4. When the conductors 5 and 6 are charged with a high current pulse for magnetization of the part 1, the regions 7 and 8 will mutually attract, due to the current flowing through the regions 7 and 8 in parallel. As a result of the attraction, the regions 7 and 8 are pressed against the part 1 to be magnetized, or at least against the surface of a mount 9 in which the part 1 to be magnetized is situated.

Because the regions 7 and 8 are movably mounted, they can have an extremely small cross section, relatively independent of the mechanical stresses thereon. The movable mounting of the regions 7 and 8 also permits those regions to be situated as close as possible to the part 1 during magnetization, because they are pressed against the part 1 with a large force. The small cross section of the regions 7 and 8, in combination with the magnetic field lines being compressed between the regions 7 and 8, results in an extremely narrow transition zone between the oppositely magnetized regions of the part 1, particularly given the absence of a permeable material which concentrates the flux.

The conductors 5 and 6 have respective terminals 10 and 11 disposed at the ends thereof, which are electrically connected to a pulsed voltage source (not shown) which can be constructed in a known manner of one or more capacitors, and means for discharging the capacitors. A power switching thyristor is preferably used for activating the pulsed current. Due to the absence of a highly permeable material in the circuit consisting of the electrical conductors 5 and 6, the circuit has a relatively low self-inductance, so that a rapid current rise and current drop, i.e., a short current pulse, can be achieved. This diminishes the energy being released during the magnetization. Such energy results primarily in a heating of the regions 7 and 8, but since the energy is maintained low, the relatively small cross sections can be used for the regions 7 and 8, in comparison to known arrangements having highly permeable carrier plates.

The significantly larger cross section of the electrical conductors 5 and 6 beyond the regions 7 and 8 additionally insures a rapid elimination of any heat which may arise in the regions 7 and 8 during magnetization. If necessary, further cooling means, such as cooling ribs or flow-through coolant conduits in the conductors may be provided.

As noted above, the electrical conductors 5 and 6, including the regions 7 and 8, can be connected in parallel. This has the advantage of avoiding the necessity of an insulation layer between the regions 7 and 8 of the part 1 to be magnetized, or between the regions 7 and 8 and the holder 9. It is also possible, however, to connect the electrical conductors 5 and 6 in series, and to provide a thin and mechanically rigid insulation between the part 1 to be magnetized and the regions 7 and 8, or between the part 1 and the electrical conductors 5 and 6.

If a series connection is to be used, it is preferable to provide the holder 9 with a thin insulating layer on the respective, opposite surface thereof facing toward the carrier plates 2 and 3, thereby forming a cover and a base for the holder 9. If this is done, the regions 7 and 8 themselves need not also be insulated. Any damage which may occur to the insulating surfaces of the holder 9 can be easily repaired by providing the holder 9 with a fresh insulating layer, when the holder 9 is removed from the fixture to insert a new part 1 to be magnetized.

To achieve a narrow intermediate or transition zone between the two oppositely magnetized regions of the part 1, it is preferable that the dimension of the regions 7 and 8 perpendicular to the surface of the part 1 to be magnetized is larger than the dimension parallel to the surface. The ratio of the perpendicular dimension to the parallel dimension, however, should not significantly exceed 3:1, so as to insure that the center of gravity of the current flowing in the webs is closely adjacent the part 1 to be magnetized.

It is possible to arrange a plurality of parts to be magnetized in one holder 9, thereby achieving a greater yield of magnetized parts with the fixture.

The electrical conductors 5 and 6 preferably consist of highly conductive copper, however, to improve further the conductivity, and thus to reduce further the cross section of the regions 7 and 8, the conductors 5 and 6 may consist of silver.

To achieve an optimally narrow transition zone, in combination with good cooling of the regions 7 and 8 between two magnetization events, it is preferable to make the cross section of the regions 7 and 8 smaller than one-half the cross section of the remaining portions of the electrical conductors 5 and 6.

Various known structures can be used for movably seating the electrical conductors 5 and 6 in the channels 4. A particularly simple structure is simply to secure the ends of the conductors 5 and 6 in the channels 4, so that the mobility of the regions 7 and 8 derives on the basis of an appropriate bending of the conductors 5 and 6 remote from the fastening locations.

Figure 3:
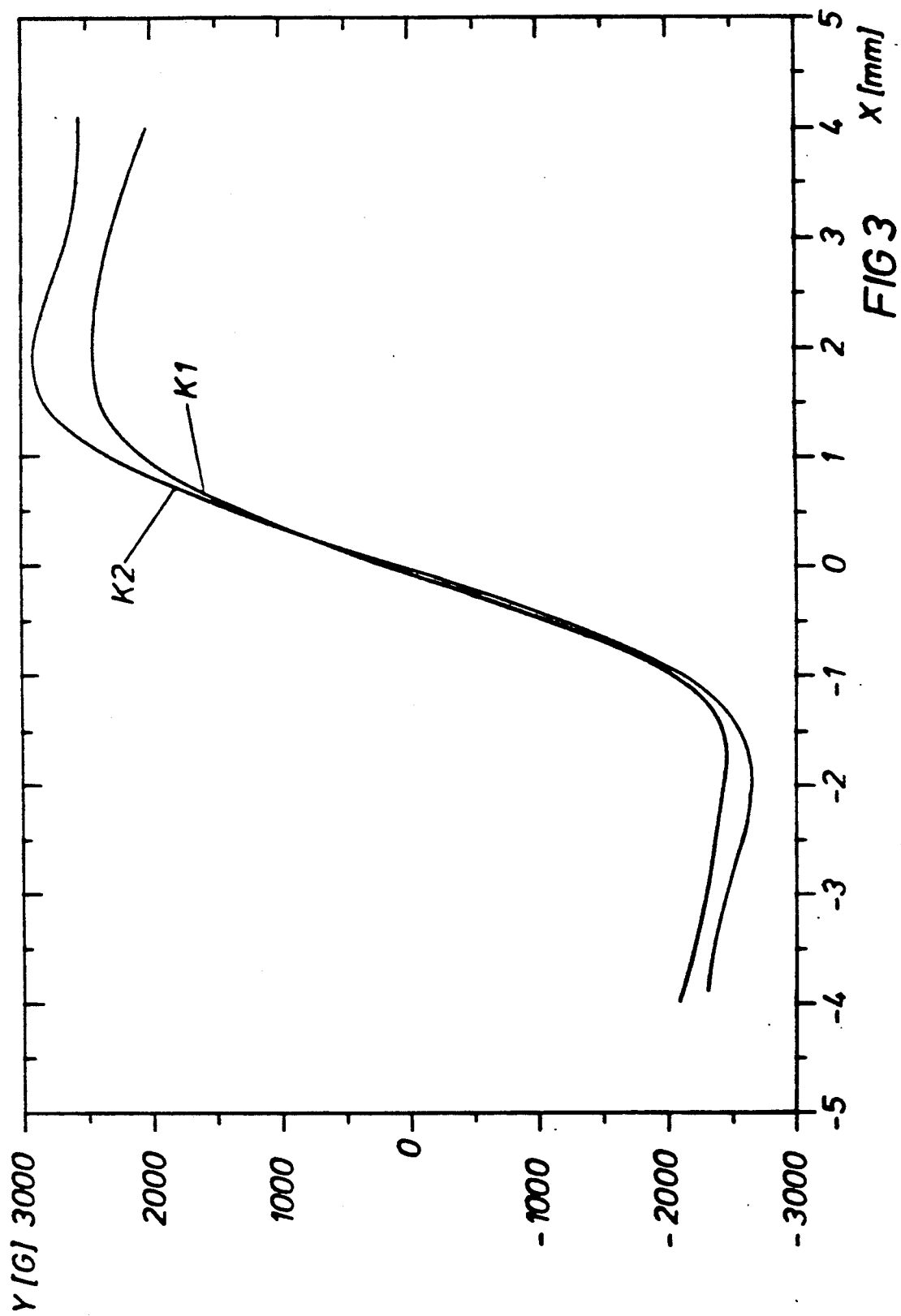
FIG. 3 shows the magnetization curve of a magnet magnetized using the fixture of FIGS. 1 and 2, operated in accordance with the principles of the present invention, in comparison to a magnet system consisting of joined individual magnets.

Two magnetization curves are shown in FIG. 3 for comparison. In FIG. 3, the length of the multi-pole magnetized magnet is shown in millimeters on the horizontal axis, and the field strength measured at the magnet in Gauss is entered on the vertical axis. The magnetization which occurs when two individually magnetized magnets are secured directly to each other, so that they have oppositely directed magnetization directions, is shown by the curve K1.

The curve K2 shows the measured magnetization of a magnet which has been magnetized in the fixture in accordance with the principles of the present invention, with the regions 7 and 8 having a cross section of $1.5 \times 3$ mm$^2$.

As can clearly be seen from the curves K1 and K2, the curve K2 is extremely close to the ideal case of the individually magnetized and subsequently combined magnets, given an appropriately small cross section of the regions 7 and 8.

Figure 4:
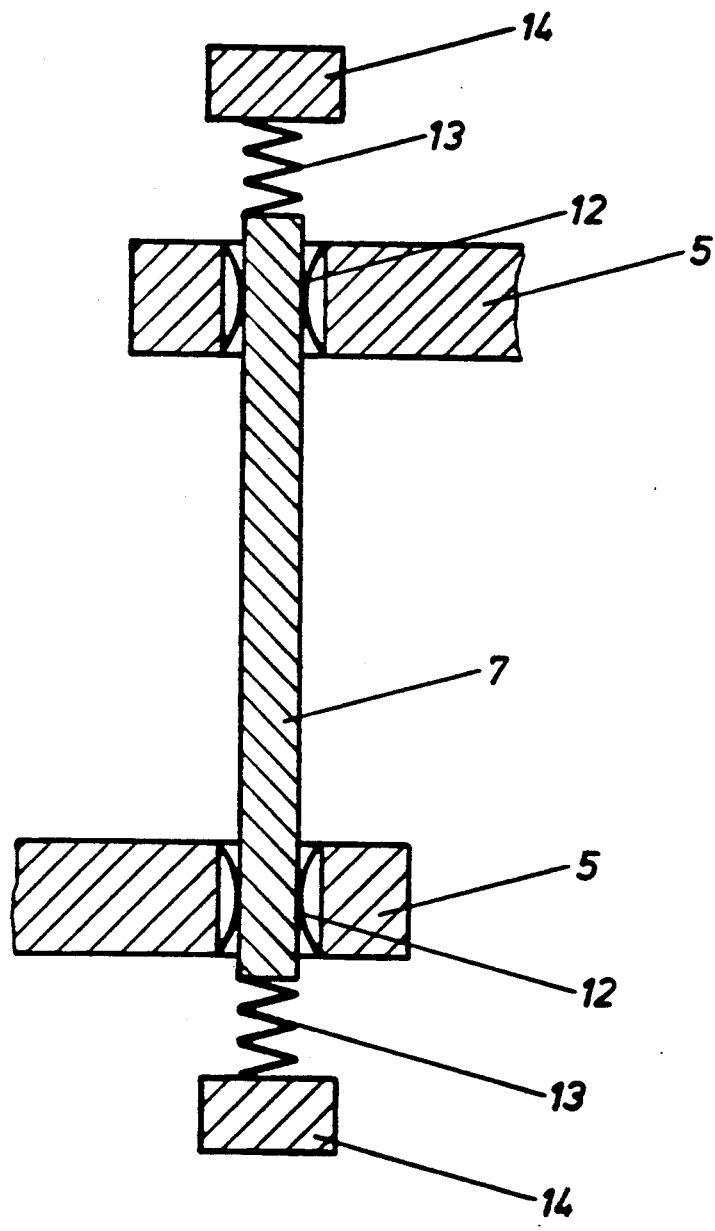
FIG. 4 is a sectional view showing structure for mounting a thin portion of the conductors in the fixture of FIGS. 1 and 2.

A further embodiment for movably mounting the regions of reduced cross section with respect to the remainder of the conductor is shown in FIG. 4, with the region 7 and the conductor 5 being used as an example. This embodiment permits the region 7 to have an extremely small cross section.

Because the region 7 has a small cross section, it will heated to a relatively high temperature during each magnetization event, so that the region 7 will expand in length as a consequence of the temperature gradient of the material, and will contract during cooling. To insure the durability of the magnetization fixture, the region 7 has opposite free ends contained in recesses of the conductor 5. Electrical contacts 12, which resiliently press against the region 7, are provided in the recesses.

In order to transmit the high currents required for magnetization via the electrical contacts 12, a plurality of such contacts may be provided, each having a relatively high spring power (resiliency). By this arrangement, it is possible for the region 7 to expand with increasing temperature given increasing current flux. If, however, the region 7 achieves an extremely high temperature, for example, in the proximity of the melting point of the material, at the end of the current pulse, the region 7 would lengthen because of the softness of the material at high temperature, given the relatively high friction between the electrical contact 12 and the region 7, and the region 7 would no longer return to its original shape.

For this reason, compression springs 13, supported by a block 14, are attached to the end faces of the region 7. The compression springs 13 have a spring constant so that they exert approximately the force required for overcoming the static friction between the electrical contacts 12 and the region 7. This insures that the region 7 can expand during heating, opposite the force of the springs 13 and opposite the friction, and additionally permits the region 7 to contract after the power surge substantially free of tensile forces.

It is also possible to dimension the springs 13 so that the region 7 is always under a slight compressive force, so that tensile forces do not occur in the region 7 at any time.

The embodiment shown in FIG. 4 permits the conductor 5 (and the conductor 6) to be rigidly secured in the carriers 2 and 3 without the mobility of the region 7 (and the region 8) in the longitudinal and transverse directions being impeded.

A significant advantage of a one-piece magnet which has been subjected to multi-pole magnetization, compared to two (or more) magnets which are individually magnetized and subsequently joined together, is that only half of the magnets (or correspondingly fewer if more than two regions are oppositely magnetized) must be employed for the manufacture of, for example, a linear motor or other devices, and therefore fewer individual magnets must be processed (eroded, coated, ground, etc.). Moreover, the assembly steps for joining the individual magnets is eliminated, or significantly reduced.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for multi-pole magnetization of a magnetizable part, comprising the steps of:
    placing said magnetic part between two serpentine electrical conductors respectively contained in channels of two carrier elements disposed on opposite sides of said magnetizable part;
    mounting a portion of each serpentine conductor, having a smaller cross section than a remainder of the conductor, in registry in said channels so as to be movable within said channel;
    arranging said magnetizable part relative to said serpentine conductors so that said magnetizable part is between and crossed by said portions of said serpentine electrical conductors; and
    energizing said serpentine electrical conductors with a power surge causing said portions of said conductors to move against said magnetizable part and thereby creating adjacent regions of opposite magnetization in said magnetizable part having a narrow transition zone therebetween coincident with the location of said portions of said conductors.

2. A method as claimed in claim 1 comprising the additional step of:
    selecting material comprising said magnetizable part from alloys of magnetic material and rare earths.

3. A method as claimed in claim 2 wherein the step of selecting the material of said magnetic part is further defined by selecting the material for said magnetic part from the group consisting of CoSm and NdFeB.

4. A method as claimed in claim 1 wherein the step of energizing said serpentine electrical conductors with a power surge is further defined by energizing said serpentine electrical conductors with a power surge having a maximum of more than 30 kA for generating a field of more than 20 kA/cm.

5. A method as claimed in claim 1 comprising the additional step of connecting said serpentine electrical conductors in parallel.

6. A method as claimed in claim 1 comprising the additional steps of:
    disposing a thin insulation layer between said magnetizable part and said portions of said serpentine electrical conductors; and
    connecting said serpentine electrical conductors in series.

7. A method as claimed in claim 1 comprising the additional step of:
    disposing said magnetizable part in a holder between said serpentine electrical conductors and between said carrier elements.

8. A method as claimed in claim 1 wherein said portions of said serpentine electrical conductors have a rectangular cross section, so that each portion has a pair of oppositely disposed narrow sides, and comprising the additional step of:
    disposing a narrow side of each of said portions of said serpentine electrical conductors facing said part to be magnetized.

9. A method as claimed in claim 1 wherein the step of mounting said portions of said serpentine electrical conductors so as to be movable within said channel is further defined by:
    rigidly attaching each serpentine electrical conductor in said channel at two points respectively disposed in said channel with said portion between said points being freely movable.

10. A method as claimed in claim 1 wherein the step of mounting said portions of said serpentine electrical conductors so as to be movable within said channels is further defined by:

resiliently holding said portion of each serpentine electrical conductor in pairs of electrical contacts at opposite ends of said portions.

11. A method as claimed in claim 1 comprising the additional of:

after energizing said serpentine electrical conductors to magnetize said magnetizable part, applying a compressive force at opposite ends of each of said portions to prevent a permanent length expansion of said portions.

12. A fixture for multi-pole magnetization of a magnetizable part, comprising:

two carriers adapted to receive a magnetizable part therebetween, each carrier having a serpentine channel therein on a surface facing said magnetizable part;

two serpentine electrical conductors respectively disposed in said channels in said carriers, each serpentine electrical conductor having a portion having a smaller cross section than a remainder of the conductor, said portions being disposed to cross said magnetizable part in registry when said magnetizable part is placed between said carrier elements; and means for mounting said portions of said serpentine electrical conductors in the respective channels of said carrier elements so that when said serpentine electrical conductors are charged with a power surge, said portions are movable against said magnetizable part for magnetizing adjacent regions in said magnetizable part in opposite directions and creating a narrow transition zone therebetween coincident with the location of said portions.

13. An apparatus as claimed in claim 12 wherein said portions of said serpentine electrical conductors have a rectangular cross section with oppositely disposed narrow sides, and wherein said portions are disposed in said channels so that a narrow side of each portion faces said magnetizable part.

14. An apparatus as claimed in claim 13 wherein each of said portions has a pair of wide sides disposed between said narrow sides, with a ratio of the dimension of a wide side to a narrow side being less than approximately 3:1.

15. An apparatus as claimed in claim 12 wherein said portions of said serpentine electrical conductors have a cross section which is less than one-half the cross section of a remainder of said serpentine electrical conductors.

16. An apparatus as claimed in claim 12 wherein said portions of said serpentine electrical conductors have a cross section of approximately $1.5 \times 3$ mm$^2$.

17. An apparatus as claimed in claim 12 wherein said means for mounting said portions of said serpentine electrical conductors so as to be movable within the respective channels comprises two rigid mechanical connection points disposed on opposite sides of each of said portions, with said portions being freely movable between said points.

18. An apparatus as claimed in claim 12 wherein said means for mounting said portions of said serpentine electrical conductors so as to be movable within the respective channels comprises a pair of resilient contacts connected to said serpentine electrical conductors and disposed in said respective channels at opposite ends of said portions, with said portions respectively disposed between said contacts.

19. An apparatus as claimed in claim 12 further comprising means disposed at opposite ends of each of said portions for preventing a length expansion of each portion after magnetization of said magnetizable part.

* * * * *